(No Model.)
G. A. WILLIAMS.
DOUGH RAISER.
No. 354,960. Patented Dec. 28, 1886.
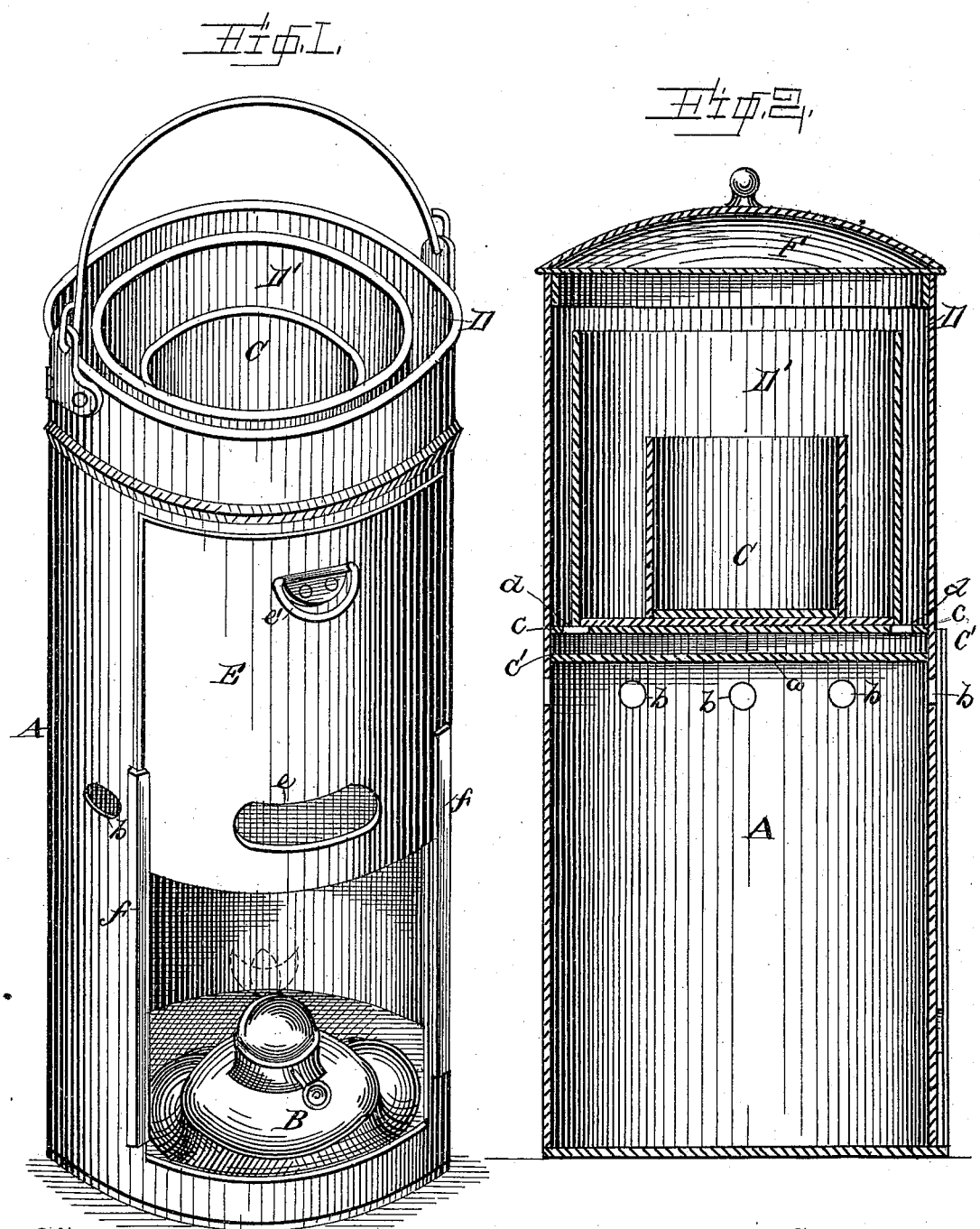
Witnesses
Willis Drummond
Robt. H. Bradford
Inventor
Glennie A. Williams.
By her Attorney
H. T. England.

UNITED STATES PATENT OFFICE.

GLENNIE A. WILLIAMS, OF KANSAS CITY, MISSOURI.

DOUGH-RAISER.

SPECIFICATION forming part of Letters Patent No. 354,960, dated December 28, 1886.

Application filed June 22, 1886. Serial No. 205,886. (No model.)

*To all whom it may concern:*

Be it known that I, GLENNIE A. WILLIAMS, a citizen of the United States, residing at Kansas City, in the county of Jackson and State of Missouri, have invented certain new and useful Improvements in Dough-Raisers; and I do hereby declare the following to be a full, clear, and exact description of the invention, such as will enable others skilled in the art to which it appertains to make and use the same.

My invention relates to new and useful improvements in a heating device for warming yeast or sponge and keeping the same at the desired temperature during fermentation, the object of my invention being to provide a neat and compact heating-stove provided with a heating-lamp within the base, and receptacles for holding sponge, yeast, and other substances above partition-walls that are formed above said lamp, whereby when yeast or sponge is placed in receptacles above the heating-lamp the exact temperature may be imparted to the same to promote constant and speedy fermentation.

It has been a source of great annoyance and delay, and often a serious loss to thousands of housekeepers, the not being able to keep the yeast or sponge at the right temperature to create and continue perfect fermentation until the yeast, sponge, or salt-rising is thoroughly developed, ready to mix with flour to form bread, biscuit, cake, or the like.

My invention effectively overcomes all objections and difficulties heretofore presented by promptly starting fermentation and keeping the right temperature, to continue the same without burning until complete or in condition to use, the necessity for continuous fermentation being apparent when yeast or salt-rising is set at night for use in the morning, when, without artificial heat, (as by cooking stove or range which is too expensive,) the temperature falls and fermentation is arrested, and in the morning, when desired for use, the yeast or sponge is dead or flat, unfit for use, thereby not only entailing a loss, but a great disappointment.

I attain the objects set forth by means of the peculiar construction and arrangement of the various parts of my invention, which will be more fully pointed out and described in the specification and claim.

Reference being had to the drawings accompanying this application, Figure 1 is a perspective view of my invention, showing parts in place for use, with cover removed. Fig. 2 is a vertical sectional view of the same.

Similar letters refer to similar parts throughout the drawings.

Referring to the drawings, A represents a case formed of metal or other suitable material and preferably cylindrical in shape, though any shape desirable may be used without departing from the spirit of my invention. A lamp, B, is placed within the casing at the bottom.

About midway the height of the casing A is formed a transverse partition, *a*, said partition being secured by its edges to the inner walls of casing A. A short distance below partition *a* are a series of perforations, *b*, formed in casing A, the purpose of the same being to create a draft and carry off the smoke and products of combustion from the lamp B. Partition *a* forms a heating-plate to heat the air above it, which occupies the space *c'* between plate *a* and plate *c*, which is secured to case A, in like manner to partition *a*, and a short distance above it. A series of elongated perforations, *d*, are formed in plate *c*, through which the heated air from air-space *c'* rises into chamber D, which occupies the space between plate *c* and the cover F.

Within chamber D are placed cups or receptacles C and D', into which the yeast or sponge is placed, these cups being made of different sizes, adapted to the amount of yeast or sponge desired to use, and are usually formed open-mouthed, without covers.

Case A is provided with a cover, F, having flanges adapted to fit inside the top of said case, the purpose of which is to retain the heat in chamber D and keep out impurities from the cups C and D'. A portion of case A is cut away to form an opening, and the edges of said opening are turned back to form grooves *f*, into which the edges of sliding door E enter, and by which said door is held in place.

Door E is provided with an opening, *e*, near its base, to admit air to lamp B, and above said opening a hand-piece, *e'*, is secured, by which said door is vertically moved.

The operation is as follows: Yeast or sponge of any kind is placed in cup C or D', the cup placed within chamber D, with its base resting on plate c. Cover F is placed on the top of chamber or case A. When lamp B is ignited, the flame ascending heats the plate a, which in turn heats the air in space c', which ascends, mingling and heating air in chamber D, which imparts heat to the cups D' or C and the contents within, when fermentation begins and continues until said yeast or rising is in condition to use with sponge or flour, which will by the above construction be uniform and continuous, without which a good sponge or rising cannot be obtained.

Having thus described my invention, what I claim, and desire to secure by Letters Patent, is—

In a yeast-fermenter, the vessel or case A, having cross-partitions a and c, the air-space c', the elongated perforations d, the side perforations, b, the sliding door E, having opening e and handle e', the bent guides f, and cover F, in combination with the cups C and D', and the lamp B, all arranged and operated substantially as shown and specified.

In testimony whereof I affix my signature in presence of two witnesses.

GLENNIE A. WILLIAMS.

Witnesses:
   J. M. RAYBURN,
   H. WILLIAMS.